United States Patent
Funabashi et al.

(10) Patent No.: US 9,303,139 B2
(45) Date of Patent: Apr. 5, 2016

(54) METHOD OF MANUFACTURING RESIN MOLDED ARTICLE, METHOD OF MANUFACTURING RESIN COMPOSITION, RESIN MOLDED ARTICLE, RESIN COMPOSITION, RESIN POWDER HAVING LOW DUST GENERATION PROPERTY, AND METHOD OF REDUCING DUST GENERATION OF RESIN

(71) Applicant: SUMITOMO BAKELITE CO., LTD., Tokyo (JP)

(72) Inventors: Masahiko Funabashi, Tokyo (JP); Hajime Mifuka, Tokyo (JP); Shinichi Ozeki, Tokyo (JP); Masakatsu Asami, Tokyo (JP)

(73) Assignee: SUMITOMO BAKELITE CO., LTD., Tokyo (JP)

( * ) Notice: Subject to any disclaimer, the term of this patent is extended or adjusted under 35 U.S.C. 154(b) by 0 days.

(21) Appl. No.: 14/379,672

(22) PCT Filed: Feb. 14, 2013

(86) PCT No.: PCT/JP2013/000799
§ 371 (c)(1),
(2) Date: Aug. 19, 2014

(87) PCT Pub. No.: WO2013/132754
PCT Pub. Date: Sep. 12, 2013

(65) Prior Publication Data
US 2015/0005445 A1    Jan. 1, 2015

(30) Foreign Application Priority Data

Mar. 7, 2012  (JP) .................. 2012-050015
Oct. 26, 2012  (JP) .................. 2012-236736

(51) Int. Cl.
| | |
|---|---|
| B29B 7/94 | (2006.01) |
| C08K 5/01 | (2006.01) |
| B29B 7/88 | (2006.01) |
| C08J 3/20 | (2006.01) |
| B29B 7/90 | (2006.01) |
| B29K 105/00 | (2006.01) |
| B29K 491/00 | (2006.01) |
| B29B 7/38 | (2006.01) |
| B29B 7/52 | (2006.01) |

(52) U.S. Cl.
CPC ... *C08K 5/01* (2013.01); *B29B 7/88* (2013.01); *B29B 7/90* (2013.01); *B29B 7/94* (2013.01); *C08J 3/201* (2013.01); *B29B 7/38* (2013.01); *B29B 7/52* (2013.01); *B29K 2065/00* (2013.01); *B29K 2105/0005* (2013.01); *B29K 2491/00* (2013.01); *C08J 2300/24* (2013.01)

(58) Field of Classification Search
CPC ............... C08K 5/01; B29B 7/94; B29B 9/10
USPC .................................... 528/497, 503
See application file for complete search history.

(56) References Cited

U.S. PATENT DOCUMENTS

| | | | |
|---|---|---|---|
| 5,447,984 | A | 9/1995 | Ohama et al. |
| 8,232,339 | B2 | 7/2012 | Takeuchi et al. |
| 8,518,424 | B2 * | 8/2013 | Sasaki et al. ............ 424/401 |
| 2007/0298062 | A1 | 12/2007 | Sasaki et al. |
| 2010/0028582 | A1 * | 2/2010 | Joch et al. ............ 428/36.91 |
| 2011/0230608 | A1 | 9/2011 | Takeuchi et al. |

FOREIGN PATENT DOCUMENTS

| | | |
|---|---|---|
| CN | 101265364 A | 9/2008 |
| CN | 101760037 A | 6/2010 |
| JP | 46-32503 B1 | 9/1971 |
| JP | 54-122346 A | 9/1979 |
| JP | 1-271452 A | 10/1989 |
| JP | 6-9787 A | 1/1994 |
| JP | 8-59324 A | 3/1996 |
| JP | 10-226780 A | 8/1998 |
| JP | 11-80712 A | 3/1999 |
| JP | 2004-277586 A | 10/2004 |
| JP | 2011-214002 A | 10/2011 |

OTHER PUBLICATIONS

International Search Report dated Apr. 16, 2013 issued in corresponding application No. PCT/JP2013/000799.
Office Action dated Aug. 18, 2015, issued in counterpart Chinese Patent Application No. 201380012534.X (7 pages).
Office Action dated Sep. 22, 2015, issued in counterpart Korean Patent Application No. 10-2014-7027838 (5 pages).

* cited by examiner

*Primary Examiner* — Tae H Yoon
(74) *Attorney, Agent, or Firm* — Westerman, Hattori, Daniels & Adrian, LLP

(57) ABSTRACT

A method of manufacturing a resin molded article includes a step of preparing a resin powder having low dust generation property by adding a liquid paraffin to a thermosetting resin, and a step of obtaining a resin molded article by heating and kneading the resin powder having low dust generation property, in which the step of preparing the resin powder having low dust generation property includes a step in which the thermosetting resin is melted and the liquid paraffin is added to the melted thermosetting resin to be stirred and mixed.

18 Claims, No Drawings

METHOD OF MANUFACTURING RESIN MOLDED ARTICLE, METHOD OF MANUFACTURING RESIN COMPOSITION, RESIN MOLDED ARTICLE, RESIN COMPOSITION, RESIN POWDER HAVING LOW DUST GENERATION PROPERTY, AND METHOD OF REDUCING DUST GENERATION OF RESIN

TECHNICAL FIELD

The present invention relates to a method of manufacturing a resin molded article, a method of manufacturing of a resin composition, a resin molded article, a resin composition, a resin powder having low dust generation property, and a method of reducing the dust generation of a resin.

BACKGROUND ART

A method of reducing the dust generation of a fine powder or a powder is as follows.

In Patent Document 1, a treatment method of reducing the dust generation of a fine powder which is easily scattered as a powder dust during an operation of slaked lime, dolomite, calcium carbonate, cement, gypsum, slag, magnesium hydroxide, or the like, is described. Specifically, an attempt of reducing the dust generation of the fine powder is performed by mixing a branched polyethyleneimine solution with respect to the fine powder.

In Patent Document 2, a method of reducing the dust generation of a powder such as quicklime, light burnt dolomite, cement, gypsum, slag, coke powder or diatomaceous earth, of which the quality is changed by adding water, is described. Specifically, an attempt of reducing the dust generation of a fine powder is performed by mixing a branched polyethyleneimine solution in which an organic solvent is used as a solvent with a powder.

As described in Patent Documents 1 and 2, there is a method of suppressing the dust generation property of a powder-like low molecular weight compound. However, for example, there has been no method of suppressing the dust generation of a powder-like high molecular weight compound such as a resin until now.

Among high molecular weight compounds, it is known that as to a thermosetting resin, the polarity of the thermosetting resin is high and it is hard to be mixed with a compound which is generally used as a lubricant.

RELATED DOCUMENT

Patent Document

[Patent Document 1] Japanese Unexamined Patent Publication No. 10-226780
[Patent Document 2] Japanese Unexamined Patent Publication No. 11-80712
[Patent Document 3] Japanese Unexamined Patent Publication No. 2011-214002

DISCLOSURE OF THE INVENTION

A thermosetting resin is usually used in a powder state. At this time, there is a problem in that since the thermosetting resin is in a powdery shape, the dust is generated and easily diffused to the periphery. In a case where the dust is generated from the thermosetting resin when used, the resin is sprinkled in an operation space, and for example, sometimes, the operation space was polluted, a powder-like resin was mixed into an operation device, and a resin was mixed into other reagents.

The present inventors found that it is possible to suppress the dust generation from the powder-like resin by adding a liquid paraffin with respect to the thermosetting resin in order to solve the above problem, and reached the present invention.

A liquid paraffin is generally added as a lubricant which improves the fluidity or the releasability of the resin when the thermoplastics resin is heated and molded. On the other hand, it is known that the thermosetting resin is not used together with such a lubricant since the fluidity thereof considerably decreases by heating.

The present invention has been made in view of the above circumstances and is to provide a resin powder in which the dust generation property is suppressed when used.

According to the present invention, there is provided a method of manufacturing a resin molded article including, a step of preparing a resin powder having low dust generation property by adding a liquid paraffin to a thermosetting resin, and a step of obtaining a resin molded article by heating and kneading the resin powder having low dust generation property, in which the step of preparing the resin powder having low dust generation property includes a step in which the thermosetting resin is melted and the liquid paraffin is added to the melted thermosetting resin to be stirred and mixed.

It is possible to suppress the dust generation property of the resin powder obtained by adding the liquid paraffin with respect to the thermosetting resin. The reason is not necessarily clear, however, it is considered as follows. When the liquid paraffin is added to the thermosetting resin, the static electricity is generated. Thus, it is considered that it is possible to suppress the rising of the fine particles since an electrostatic attraction acts between the fine particles.

In addition, the thermosetting resin is preferably a phenol resin or an epoxy resin, and the liquid paraffin preferably includes a cycloparaffin. In doing so, it becomes easier to uniformly mix the thermosetting resin with the liquid paraffin.

Furthermore, according the present invention, there is provided a method of manufacturing a resin composition including, a step of preparing a resin powder having low dust generation property containing a thermosetting resin and a liquid paraffin, and a step of obtaining a resin composition by dry mixing the resin powder having low dust generation property with a filler.

Furthermore, according to the present invention, there is provided a resin composition obtained by the method of manufacturing the resin composition.

Furthermore, according to the present invention, there is provided a method of manufacturing a resin molded article including, a step of obtaining a resin molded article from the resin composition obtained by the method of manufacturing the resin composition.

Furthermore, according to the present invention, there is provided a resin molded article obtained by the method of manufacturing the resin molded article.

Furthermore, according to the present invention, there is provided a resin powder having low dust generation property including, a thermosetting resin and a liquid paraffin, in which the average particle diameter is equal to or more than 1 μm and equal to or less than 100 μm.

Furthermore, according to the present invention, there is provided a method of reducing dust generation of a resin, in which case, when one cup of a resin measured out by using a 100 cc plastic cup is dropped from 1 m above the ground at 25° C., an amount of dust generation of a resin powder obtained by adding a liquid paraffin into a melted thermosetting resin is reduced compared to a resin obtained without adding the liquid paraffin into the melted thermosetting resin.

According to the present invention, a resin powder in which the dust generation property is suppressed when used can be provided.

DESCRIPTION OF EMBODIMENTS

First Embodiment

A method of manufacturing a resin molded article according to the present embodiment is a method of preparing a resin powder having low dust generation property by adding a liquid paraffin to a thermosetting resin, and afterward, obtaining a resin molded article by heating and kneading the resin powder having low dust generation property. In addition, in a case of preparing the resin powder having low dust generation property, the resin powder having low dust generation property is obtained by a method as described below. It is possible to obtain the resin powder having low dust generation property by melting the thermosetting resin and adding the liquid paraffin to the melted thermosetting resin to be stirred and mixed.

In the present embodiment, the low dust generation property indicates that the powder is hardly risen to the periphery when a powder-like resin is used. That is, the resin powder having low dust generation property indicates a resin powder in which the resin is hardly risen in an operation space when used.

Specifically, according to the resin powder having low dust generation property according to the present embodiment, it is possible to reduce the amount of the dust generation of the resin powder obtained by adding the liquid paraffin into the melted thermosetting resin when a cup of the resin is measured out by using a 100 cc plastic cup to drop from 1 m above the ground at 25° C. compared to a case of not adding the liquid paraffin.

Firstly, description will be given of a method of manufacturing a resin powder having low dust generation property in detail.

(Method of Manufacturing Resin Powder Having Low Dust Generation Property)

The resin powder having low dust generation property can be obtained by mixing the thermosetting resin with the liquid paraffin.

As a method of manufacturing a resin powder having low dust generation property, for example, there is a method described below. Firstly, the thermosetting resin is melted, the melted thermosetting resin and the liquid paraffin are stirred and mixed, and a resin mixture is obtained. Next, the resin powder having low dust generation property is obtained by pulverizing the obtained resin mixture. In doing so, it is possible to obtain the resin powder in which the thermosetting resin and the liquid paraffin are finely dispersed. That is, it is possible to uniformly and finely disperse the thermosetting resin and the liquid paraffin in the resin powder having low dust generation property to be compounded.

The mixing temperature of the thermosetting resin and the liquid paraffin is preferably equal to or more than 80° C. and equal to or less than 250° C. It becomes easier to uniformly mix the thermosetting resin with the liquid paraffin by mixing in a range of this temperature.

Moreover, when the thermosetting resin is mixed with the liquid paraffin, it is possible to suppress the dust generation property of the obtained resin powder by mixing these components as uniformly as possible.

In addition, it is preferable to add equal to or more than 0.05% by weight and equal to or less than 2% by weight of the liquid paraffin and it is more preferable to add equal to or more than 0.1% by weight and equal to or less than 1% by weight of the liquid paraffin, with respect to the total weight of the thermosetting resin. It is possible to further suppress the dust generation property of the obtained resin powder owing to the additive amount of the liquid paraffin being in this range.

Moreover, in a case of pulverizing the resin mixture obtained by mixing the thermosetting resin with the liquid paraffin, the average particle diameter of the obtained resin powder having low dust generation property is non-uniform, however, it is possible to cause a uniform electrostatic interaction by uniformizing the particle diameter using a sieve. In this manner, it is possible to further suppress the dust generation property of the obtained resin powder by uniformizing the particle diameter. The average particle diameter of the resin powder having low dust generation property is equal to or more than 1 μm and equal to or less than 500 μm, preferably equal to or more than 1 μm and equal to or less than 100 μm and more preferably equal to or more than 5 μm and equal to or less than 100 μm. It is possible to further suppress the dust generation property of the obtained resin powder owing to the average particle diameter of the resin powder having low dust generation property being in this range.

(Method of Manufacturing of Resin Molded Article)

Next, description will be given of a method of manufacturing a resin molded article from the resin powder having low dust generation property obtained by the method describe above.

In the present embodiment, it is possible to manufacture a resin molded article by heating and kneading the resin powder having low dust generation property to be molded into the desired shape. As a resin molded article, for example, a grindstone, a casting, a friction material, a rubber molded article, an adhesive tape, a felt, a mold material, a heat resistance material, a heat insulating agent and the like are included, however, the resin molded article is not limited thereto.

In addition, when the resin powder having low dust generation property is heated and kneaded, a filler may be appropriately added in accordance to the use of the resin molded article.

In addition, heating and kneading may be performed by a kneader alone such as, for example, a roll, a cokneader or a twin-screw extruder or may be performed by combining another kneader with a roll.

(Resin Powder Having Low Dust Generation Property)

The resin powder having low dust generation property according to the present embodiment includes the thermosetting resin and the liquid paraffin. In doing so, it is possible to obtain the resin powder in which the dust generation property is suppressed when used. The reason is not necessarily clear, however, it is considered as follows. When the liquid paraffin is added to the thermosetting resin, the static electricity is generated. The charging quantity of the powder is improved in accordance with the generation of the static electricity. That is, an electrostatic attraction acts between the fine particles forming the powder by an electric charge. The rising of each fine particle generated when the powder is used is suppressed due to this force, and thus it is considered that the dust generation property is also suppressed.

The average particle diameter of the resin powder having low dust generation property according to the present embodiment is equal to or more than 1 μm and equal to or less than 500 μm, preferably equal to or more than 1 μm and equal to or less than 100 μm and more preferably equal to or more than 5 μm and equal to or less than 100 μm. It is possible to further suppress the dust generation property of the obtained resin powder owing to the average particle diameter of the resin powder having low dust generation property being in this range.

The thermosetting resin in the present embodiment is not particularly limited, however, for example, phenol resins, epoxy resins, melamine resins, urea resins, oxetane resins, (meth)acrylate resins, unsaturated polyester resins, diallyl phthalate resins, maleimide resins, and the like are included. In addition, these can also be used alone or in combination of two or more kinds thereof. Among those, phenol resins or epoxy resins are preferable.

In a case where a phenol resin or an epoxy resin is used, it is possible to further uniformize a mixing degree with the liquid paraffin. Therefore, it is possible to further suppress the dust generation property of the obtained resin powder.

The phenol resin in the present embodiment is one obtained by reacting phenols with aldehydes in the presence of an alkaline or acidic catalyst, and has at least one or more phenolic hydroxyl groups in an aromatic ring. Moreover, a method of reacting phenols with aldehydes is not particularly limited, and a well-known method can be employed.

As a phenol resin, for example, a phenol resin, a cresol resin, a resorcin resin, a xylenol resin, a naphthol resin, a bisphenol A resin, an aralkyl phenol resin, a biphenylaralkyl phenol resin, a modified phenol resin by cashew nuts oil or the like having a phenolic hydroxyl group, and the like are included. In addition, various kinds of modified phenol resins such as a xylene-modified phenol resin containing a substance having a phenolic hydroxyl group, an oil-modified phenol resin modified with phenols and a rosin, terpene oil or the like or a rubber-modified phenol resin modified with a rubber, or the like can also be used.

As phenols used to obtain the phenol resin, one having a phenolic hydroxyl group in an aromatic ring is preferable, furthermore, phenols may have a substituent except a phenolic hydroxyl group. For example, phenol, cresol such as o-cresol, m-cresol or p-cresol, mixed cresol, xylenol such as 2,3-xylenol, 2,4-xylenol, 2,5-xylenol, 2,6-xylenol, 3,4-xylenol or 3,5-xylenol, ethylphenol such as o-ethylphenol, m-ethylphenol or p-ethylphenol, isopropylphenol, butylphenol such as butylphenol or p-tert-butylphenol, alkylphenol such as p-tert-amyl phenol p-octylphenol, p-nonylphenol or p-cumylphenol, halogenated phenol such as fluorophenol, chlorophenol, bromophenol or iodophenol, a monovalent phenol substitution product such as p-phenyl phenol, amino phenol, nitrophenol, dinitrophenol or trinitrophenol, a monovalent naphthol such as 1-naphthol or 2-naphthol, polyphenols such as resorcin, alkyl resorcin, pyrogallol, catechol, alkyl catechol, hydroquinone, alkyl hydroquinone, phloroglucin, bisphenol A, bisphenol F, bisphenol E, bisphenol S or dihydroxy naphthalene, cashew nuts oil configured by a substance having a phenolic hydroxyl group, and the like are included. These can be used alone or in combination of two or more kinds thereof. In addition, a copolymer of these phenols having a phenolic hydroxyl group with another substance which does not contain a phenolic hydroxyl group may be used. From this, it is possible to obtain the phenol resin having at least one or more phenolic hydroxyl groups in a molecule.

In addition, as aldehydes used to obtain the phenol resin, for example, formaldehyde, paraformaldehyde, trioxane, acetaldehyde, propionaldehyde, polyoxymethylene, chloral, hexamethylenetetramine, furfural, glyoxal, n-butyraldehyde, caproaldehyde, allyl aldehyde, benzaldehyde, crotonaldehyde, acrolein, tetraoxymethylene, phenyl acetaldehyde, o-tolualdehyde, salicylaldehyde, para-xylene dimethyl ether and the like are included. These can also be used alone or in combination of two or more kinds thereof.

The catalyst in case of obtaining the phenol resin is not particularly limited, and an acid catalyst, a base catalyst, a transition metal salt catalyst and the like are included. As an acid catalyst, for example, an inorganic acid such as hydrochloric acids, sulfuric acids or phosphoric acids, or an organic acid such as oxalic acid, p-toluenesulfonic acid or organic phosphonic acid can be used. In addition, as a base catalyst, for example, an alkali metal hydroxide such as sodium hydroxide, potassium hydroxide or lithium hydroxide, an alkaline earth metal hydroxide such as calcium hydroxide or barium hydroxide, amines such as ammonia or alkyl amine, or the like can be used. Furthermore, as a transition metal salt catalyst, for example, zinc oxalate, zinc acetate, and the like are included.

In addition, as an epoxy resin, for example, a novolac type epoxy resin such as a phenol novolac type epoxy resin or a cresol novolac type epoxy resin; a bisphenol type epoxy resin such as a bisphenol A type epoxy resin or a bisphenol F type epoxy resin; an aromatic glycidyl amine type epoxy resin such as N,N-diglycidyl aniline, N,N-diglycidyl toluidine, diaminodiphenylmethane type glycidyl amine or amino phenol type glycidylamine; a hydroquinone type epoxy resin; a biphenyl type epoxy resin; a stilbene type epoxy resin; a triphenolmethane type epoxy resin; a triphenol propane type epoxy resin; an alkyl-modified triphenolmethane type epoxy resin; a triazine nucleus-containing epoxy resin; a dicyclopentadiene-modified phenol type epoxy resin; a naphthol type epoxy resin; a naphthalene type epoxy resin; a naphthylene ether type epoxy resin; an aralkyl type epoxy resin such as a phenol aralkyl type epoxy resin having a phenylene and/or biphenylene skeleton or a naphthol aralkyl type epoxy resin having a phenylene and/or biphenylene skeleton; and an aliphatic epoxy resin such as alicyclic epoxy such as vinylcyclohexene dioxide, dicyclopentadiene oxide or alicyclic diepoxy-adipate are included. These may be used alone or in combination of two or more kinds thereof.

These thermosetting resins may contain other components such as a curing agent, an inorganic filler, a curing accelerator, a coupling agent or an inorganic flame retardant when used. In doing so, it becomes possible to appropriately prepare the resin powder having low dust generation property which is suitable for various methods of using depending on a difference in characteristics which are required for the resin mixture.

The liquid paraffin included in the resin powder having low dust generation property is not particularly limited, however, it is preferable to include a cycloparaffin. A cycloparaffin is uniformly and easily mixed with the thermosetting resin, and when a cycloparaffin is set to the resin powder, the degree of the suppression of the dust generation property when used can be set to be more excellent.

Moreover, as described in Patent Document 3, an example in which the liquid paraffin is use as a lubricant by combining with the thermoplastics resin was known. However, generally, using the liquid paraffin by combining with the thermosetting resin has not been conducted.

Second Embodiment

A resin molded article in the present embodiment differs from that of the first embodiment in that the resin powder having low dust generation property and a filler are dry mixed to manufacture a resin composition after the resin powder having low dust generation property including the thermosetting resin and the liquid paraffin is prepared, and a resin molded article is manufactured from the obtained resin composition.

In addition, also in the present embodiment, as the method of manufacturing the resin powder having low dust generation property and the resin powder having low dust generation property, the same ones as described in the first embodiment can also be used.

Hereinafter, description will be given of a method of manufacturing a resin composition and a resin molded article obtained from the resin composition according to the present embodiment.

(Method of Manufacturing Resin Composition)

Firstly, the resin powder having low dust generation property and various kinds of fillers are dry mixed. Here, dry mixing indicates that the resin powder having low dust generation property and the filler respectively are mixed without melting. In addition, when the resin powder having low dust generation property and various kinds of fillers are dried and mixed, each component may be heated, however, a form such as heating and kneading in which any one of them is melted and kneaded is not used. In doing so, it is possible to obtain the resin composition according to the present embodiment. According to the present embodiment, since it is possible to suppress the generation of the dust by the powder being diffused to the periphery by using the resin powder having low dust generation property, it is possible to prevent the operation space from being polluted, the resin powder from being mixed into an operation device, the resin powder from being mixed into other reagents or the like, which occurs in the related art.

Here, various kinds of fillers are not particularly limited, and for example, an abrasive grain, an inorganic filler, an organic filler, silica sand, a curing agent, a coupling agent, a rubber, a base material, a solvent, a pigment, a fiber, a surfactant, an agglomerating agent, a hair material, a foaming agent, a glass, an aggregate, carbon, acid and the like are included.

(Method of Manufacturing Resin Molded Article)

The resin composition obtained by dry mixing is not particularly limited, however, can be used in various methods such as, for example, heating and kneading, melting and molding, hot molding, hot execution, applying onto a base material, fixing onto another manufacturing material or impregnating a base material. In doing so, it is possible to obtain the resin molded article including the resin powder having low dust generation property according to the present embodiment.

In addition, the resin composition in the present embodiment can be used as a resin material or a molded material for obtaining various kinds of resin molded articles described below. The resin composition can be used, for example, as (1) a resin material for obtaining a grindstone such as a general grinding wheel, a heavy duty grinding wheel, a cutting-off grindstone, an offset grindstone, for treatment of a glass cloth or a diamond grindstone, (2) a resin material for obtaining an abrasive cloth and paper such as an abrasive cloth, an abrasive paper, a disc sandpaper or a buffing, (3) a resin material for obtaining a casting such as a shell molding method (cold coat, semi-hot coat, dry-hot coat), organic self-curing property (cold box, phenol urethane, phenolic acid curing, Lino cure, furan, organic acid ester), a hot box, a shell adhesive agent or a mold washing material, (4) a resin material for obtaining a friction material such as a brake lining, a clutch facing, a disc pad, paper clutch facing or a brake shoe, (5) a resin material for obtaining a rubber such as rubber reinforcement, a hot-melt adhesive agent, an adhesive tape, rubber based adhesive agent composition, rubber latex composition, tackifier, a pressure sensitive adhesive agent, metallic adhesive agent composition, rubber vulcanization or a sealing material, (6) a resin material for obtaining an electric insulation material such as a capacitor coating film or an insulating varnish, (7) a resin material for obtaining a painting and printing ink such as a base for painting, an oil-modified paint, a paint for furniture, a paint for a metal can, a printing ink, offset printing, a dyeing auxiliary or a photoresist, (8) a resin material for obtaining an organic material such as a felt, phenol foam, wood powder mold, a phenol resin fiber, a hard board, a particle board, a reinforced wood or an insulation board, (9) a resin material for obtaining a pulp-impregnating product such as beater addition, a battery separator, an air filter or an oil filter, (10) a resin material for obtaining an inorganic fiber-bonding product such as a glass fiber product (a mat or a heat insulation tube), a rock wool and slag wool product or a fishing rod, (11) a resin material for obtaining a refractory product such as a monolithic material (a mud material, a gunning material, a stamp material, a throwing-in material, a pressing-in material or a castable material), a shaped material (basic unfiring material, silicon carbide firing material, a sliding nozzle or a dipping nozzle), a feeder head heat insulation material, a tundish board, a primary aggregate bonding material or a crucible, (12) a resin material for obtaining an adhesive agent for woodworking such as a plywood (type special), a laminated lumber or a panel adhesive agent, (13) a resin material for obtaining another product such as an impermeable carbon product, a carbonaceous sealing material, an electric brush, a sliding material, an activated charcoal, an anticorrosion joint agent, an epoxy resin curing agent, a cast molding or a phenol FRP.

EXAMPLES

Example (1) Manufacturing Resin Powder Having Low Dust Generation Property

Firstly, 1,000 parts by weight of a phenol resin (SUMILITE resin (registered trademark) PR-50731 manufactured by SUMITOMO BAKELITE CO., LTD.) was put into a 3 L round bottle type separable flask, and melted by the temperature being raised to 200° C. Moreover, as to the cylinder type separable flask which is used herein, one provided with a stirring device, a reflux condenser and a thermometer is used.

Next, 2 parts by weight of the liquid paraffin (MORESCO WHITE P-350P manufactured by MORESCO Corporation) was added with respect to the total weight of the melted phenol resin, and stirred and mixed at 200° C.

Next, the resin which was melted and mixed was taken out to a bat made of stainless steel, and cooled down at 25° C. (room temperature) to obtain a solid resin. Then, the obtained solid resin was pulverized by a ball mill until the average particle diameter of the solid resin becomes 30 μm to produce the powder.

(2) Evaluation Method and Result

A cup of powder which was produced was measured out by using a 100 cc plastic cup to drop from 1 m above the ground at 25° C. Even if the powder produced in this way fell, the generation of the dust almost did not occur.

Comparative Example

In manufacturing the powder in Example, the powder in Comparative Example was manufacture without adding the liquid paraffin.

The evaluation of the dust generation property was performed in the same way as Example. As a result, the dust was intensely generated from the obtained powder.

In this manner, it is possible to obtain the resin powder having excellent degree of the suppression of the dust generation property when used by mixing the liquid paraffin with respect to the thermosetting resin, compared to a case of not mixing the liquid paraffin.

(Manufacturing Resin Composition)

The resin composition was obtained by dry mixing the filler with respect to the resin powders obtained in Example and Comparative Example. At this time, the generation of the dust almost did not occur when the resin powder obtained in Example was dry mixed with the filler. On the other hand, as to the resin powder obtained in Comparative Example, the dust was intensely generated when dry mixing with the filler.

(Manufacturing Resin Molded Article)

It was possible to obtain the resin molded article when the obtained resin powder and resin composition were respectively used, and heated and kneaded.

Hereinbefore, description was given of the embodiments of the present invention, however, these are illustrations of the present invention and it is also possible to employ various kinds of configurations except the above.

This application claims a priority based on Japanese Patent Application No. 2012-050015, filed Mar. 7, 2012 and Japanese Patent Application No. 2012-236736, filed Oct. 26, 2012, and the disclosures of which are incorporated by reference herein in their entirety.

The invention claimed is:

1. A method of manufacturing a resin molded article comprising:
   a step of preparing a resin powder having low dust generation property by adding a liquid paraffin to a thermosetting resin; and
   a step of obtaining a resin molded article by heating and kneading the resin powder having low dust generation property,
   wherein the step of preparing the resin powder having low dust generation property includes a step in which the thermosetting resin is melted and the liquid paraffin is added to the melted thermosetting resin to be stirred and mixed.

2. The method of manufacturing a resin molded article according to claim 1,
   wherein the step of preparing the resin powder having low dust generation property includes a step in which the melted thermosetting resin and the liquid paraffin are stirred and mixed to obtain a resin mixture and then the resin powder having low dust generation property is obtained by pulverizing the resin mixture.

3. The method of manufacturing a resin molded article according to claim 1,
   wherein the thermosetting resin includes a phenol resin or an epoxy resin.

4. The method of manufacturing a resin molded article according to claim 1,
   wherein the liquid paraffin includes a cycloparaffin.

5. The method of manufacturing a resin molded article according to claim 1,
   wherein equal to or more than 0.05% by weight and equal to or less than 2% by weight of the liquid paraffin is included with respect to the total weight of the thermosetting resin.

6. The method of manufacturing a resin molded article according to claim 1,
   wherein the average particle diameter of the resin powder having low dust generation property is equal to or more than 1 μm and equal to or less than 100 μm.

7. A method of manufacturing a resin composition comprising:
   a step of preparing a resin powder having low dust generation property containing a thermosetting resin and a liquid paraffin; and
   a step of obtaining a resin composition by dry mixing the resin powder having low dust generation property with a filler.

8. The method of manufacturing a resin composition according to claim 7,
   wherein the step of preparing the resin powder having low dust generation property includes a step in which the thermosetting resin is melted and the liquid paraffin is added to the melted thermosetting resin to be stirred and mixed.

9. The method of manufacturing a resin composition according to claim 8,
   wherein the step of preparing the resin powder having low dust generation property includes a step in which the melted thermosetting resin and the liquid paraffin are stirred and mixed to obtain a resin mixture and then the resin powder having low dust generation property is obtained by pulverizing the resin mixture.

10. The method of manufacturing a resin composition according to claim 7,
    wherein the thermosetting resin includes a phenol resin or an epoxy resin.

11. The method of manufacturing a resin composition according to claim 7,
    wherein the liquid paraffin includes a cycloparaffin.

12. The method of manufacturing a resin composition according to claim 7,
    wherein equal to or more than 0.05% by weight and equal to or less than 2% by weight of the liquid paraffin is included with respect to the total weight of the thermosetting resin.

13. The method of manufacturing a resin composition according to claim 7,
    wherein the average particle diameter of the resin powder having low dust generation property is equal to or more than 1 μm and equal to or less than 100 μm.

14. A method of manufacturing a resin molded article comprising:
    a step of obtaining a resin molded article from a resin composition obtained by the method of manufacturing a resin composition according to claim 7.

15. The method of manufacturing a resin molded article according to claim 14,
    wherein the step of obtaining a resin molded article includes a step of heating and kneading the resin composition.

16. The method of manufacturing a resin molded article according to claim 14,
    wherein the step of obtaining a resin molded article includes a step of melting and molding the resin composition.

17. The method of manufacturing a resin molded article according to claim 14,
    wherein the step of obtaining a resin molded article includes a step of applying the resin composition onto a base material.

18. A method of reducing dust generation of a resin comprising adding a liquid paraffin into a melted thermosetting resin, and obtaining a resin powder, wherein when one cup of the resin powder measured out by using a 100 cc plastic cup is dropped from 1 m above the ground at 25° C., an amount of dust generation of the resin powder obtained by adding the liquid paraffin into the melted thermosetting resin is reduced compared to a resin powder obtained without adding the liquid paraffin into the melted thermosetting resin.

* * * * *